(12) United States Patent
Sakai et al.

(10) Patent No.: US 7,142,708 B2
(45) Date of Patent: Nov. 28, 2006

(54) DEFECT DETECTION METHOD AND ITS APPARATUS

(75) Inventors: Kaoru Sakai, Yokohama (JP); Shunji Maeda, Yokohama (JP); Takafumi Okabe, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 569 days.

(21) Appl. No.: 10/176,611

(22) Filed: Jun. 24, 2002

(65) Prior Publication Data

US 2003/0021462 A1    Jan. 30, 2003

(30) Foreign Application Priority Data

Jun. 22, 2001    (JP)    ............... 2001-188994

(51) Int. Cl.
*G06K 9/00*    (2006.01)
(52) U.S. Cl. ............... 382/149; 356/394; 382/274
(58) Field of Classification Search ............... 250/310; 324/750, 752; 356/364, 394; 382/141, 149, 382/274, 151
See application file for complete search history.

(56) References Cited

U.S. PATENT DOCUMENTS

| | | | | |
|---|---|---|---|---|
| 5,173,719 A * | 12/1992 | Taniguchi et al. | ...... | 356/394 |
| 5,649,022 A * | 7/1997 | Maeda et al. | ...... | 382/141 |
| 5,764,363 A * | 6/1998 | Ooki et al. | ...... | 356/364 |
| 5,804,980 A * | 9/1998 | Nikawa | ...... | 324/752 |
| 5,986,263 A * | 11/1999 | Hiroi et al. | ...... | 250/310 |
| 6,110,123 A * | 8/2000 | Ishihara et al. | ...... | 600/534 |
| 6,248,988 B1 * | 6/2001 | Krantz | ...... | 250/201.3 |
| 6,252,412 B1 * | 6/2001 | Talbot et al. | ...... | 324/750 |
| 6,295,374 B1 * | 9/2001 | Robinson et al. | ...... | 382/218 |
| 6,365,897 B1 * | 4/2002 | Hamashima et al. | ...... | 250/310 |
| 6,373,054 B1 * | 4/2002 | Hiroi et al. | ...... | 250/310 |
| 6,509,750 B1 * | 1/2003 | Talbot et al. | ...... | 324/750 |
| 6,535,628 B1 * | 3/2003 | Smargiassi et al. | ...... | 382/149 |
| 6,539,106 B1 * | 3/2003 | Gallarda et al. | ...... | 382/149 |
| 6,583,068 B1 * | 6/2003 | Yan et al. | ...... | 438/761 |
| 6,583,634 B1 * | 6/2003 | Nozoe et al. | ...... | 324/751 |
| 6,603,542 B1 * | 8/2003 | Chase et al. | ...... | 356/237.4 |
| 6,690,469 B1 * | 2/2004 | Shibata et al. | ...... | 356/369 |
| 6,822,690 B1 * | 11/2004 | Iida | ...... | 348/364 |
| 6,900,888 B1 * | 5/2005 | Yoshida et al. | ...... | 356/237.4 |
| 6,947,587 B1 * | 9/2005 | Maeda et al. | ...... | 382/149 |

* cited by examiner

*Primary Examiner*—Matthew C. Bella
*Assistant Examiner*—Gregory Desire
(74) *Attorney, Agent, or Firm*—Antonelli, Terry, Stout and Kraus, LLP.

(57) ABSTRACT

An object of the present invention is to provide a defect detection method and its apparatus which can adjust sensitivity easily by managing both reduction in the number of false reports and highly-sensitive detection of a defect using single threshold value setting in comparison inspection that compares an image to be inspected with a reference image to detect a defect judging from a difference between the images. According to the present invention, adjusting the brightness before inspection so that a difference becomes small at the edges of a high-contrast pattern in a target image enables reduction in the number of false reports caused by an alignment error, and achievement of highly-sensitive defect inspection using a low threshold value, without increasing the threshold value. Moreover, in the case of inspection targeted for a semiconductor wafer, which produces a problem of irregularity in brightness of a pattern caused by a difference between film thicknesses, the present invention reduces the number of false reports caused by the irregularity in brightness, and realizes inspection with high sensitivity without increasing a threshold value, by adjusting the brightness of both images before the inspection.

23 Claims, 12 Drawing Sheets

(a)

(b)

(a)

(b)

(a)

(b)

(c)

(a)

(b)

(c)

(a)

(b)

(c)

DEFECT DETECTION METHOD AND ITS APPARATUS

BACKGROUND OF THE INVENTION

The present invention relates to a defect detection method and an apparatus therefor in which an image of a target such as a semiconductor wafer, a TFT, and a photo mask, which is obtained using light or a laser beam, is compared with a reference image stored beforehand, and then a minute pattern defect, a foreign material, and the like are inspected judging from a difference obtained by the comparison. In particular, the present invention relates to a defect detection method and an apparatus therefor that are suitable for visual inspection of a semiconductor wafer.

The prior art in which an image to be inspected is compared with a reference image so as to detect a defect is disclosed by Japanese Patent Laid-Open No. 05-264467.

This method comprises the following steps: successively picking up a sample to be inspected, on which repeated patterns are regularly arranged in rows, using a line sensor; comparing the picked-up image with an image delayed by a period of time equivalent to a repeated pattern pitch; and detecting disagreement between the images as a pattern defect. However, in reality, there are the vibration of a stage and the inclination of a target, which may cause the positions of two images to become misaligned. Accordingly, it is necessary to determine the quantity of displacement of the image picked up by the sensor relative to the image delayed by a period of time equivalent to a repeated pattern pitch. In addition, after aligning two images on the basis of the quantity of displacement which has been determined, a difference between the images is calculated. Then, if the difference is larger than a predetermined threshold value, it is judged to be defective; or if not, it is judged to be nondefective.

As described above, in the prior art, a defect is inspected by the steps as follows: detecting displacement of the image to be inspected relative to the reference image, aligning a position of the image, and then, comparing the images (that is to say, calculating a difference between the two images), followed by extracting a defect. However, if the quantity of displacement is not correctly determined when the displacement is detected, the alignment will be performed at a wrong position. In this case, on the image to be aligned, a difference of the image to be aligned does not become large in an area where a change in brightness is small; however, the difference also becomes large in an area where a change in brightness is large. For example, reference numeral 11 in FIG. 1A is an image to be inspected; reference numeral 12 is an example of a reference image; reference numeral 1a is a uniformly bright background area; and reference numeral 1b is an area having a dark pattern on a bright background. In addition to it, the image to be inspected 11 includes a defect 1c. A waveform of luminance values along line 1D–1D' on the image of this example plots a graph as illustrated in FIG. 1B.

When the quantity of displacement of the image to be inspected 11 relative to the reference image 12 is correctly determined, a difference image as shown in FIG. 2 is produced after the alignment of the image to be inspected 11 with the reference image 12. The difference image is an image which is shaded according to a difference value between corresponding positions of the image to be inspected and the reference image. If a part, a difference value of which is larger than or equal to a specific threshold value TH, is regarded as a defect, only the defect 1c of the image to be inspected 11 is detected in FIG. 2. However, if the quantity of displacement of the image to be inspected 11 relative to the reference image 12 is incorrectly calculated, a difference image as shown in FIG. 3B is produced after the alignment. In an area like pattern edges in the area 1b where a change in luminance value is large, even slight displacement causes a difference value to become larger. Therefore, the area is detected as a defect. Basically, this should not be detected as a defect. In other words, it is a false report.

Conventionally, as a method for preventing a false report from occurring as shown in FIG. 3A, a threshold value TH is increased to TH2 as shown in FIG. 3B. This method decreases sensitivity, with the result that a defect having a difference value smaller than or equal to that of the edges cannot be detected. Alternatively, as shown in FIG. 3C, a high threshold value like TH2 is used in a high-contrast part where a false report easily occurs; and the threshold value TH which is lower than TH2 is used in a low-contrast part where a false report rarely occurs. This means that a plurality of threshold values has to be handled, leading to complicated adjustment of sensitivity.

Moreover, in the case where an object to be inspected is a semiconductor wafer, even if the quantity of displacement is correctly determined, a difference in film thickness in the wafer causes a difference in brightness between the same patterns of the image to be inspected and the reference image as indicated by reference character 4a in FIG. 4A and reference character 4b in FIG. 4B. A value of the difference in brightness becomes large as indicated by reference character 4c in FIG. 4C. This is also a false report. In order to prevent such a false report from being detected, as shown in FIG. 4D, a threshold value TH should be increased to a value like TH2. Otherwise, an individual threshold value should be given to each of an area having irregularity in brightness and an area not having irregularity in brightness.

In order to solve the problems of the conventional inspection technologies, the present invention provides a defect detection method and an apparatus therefor characterized by the following: in comparison inspection that compares an image to be inspected with a reference image to detect a defect judging from a difference between the images, decreasing the sensitivity only for a high-contrast part in a targeted image before inspection enables reduction in the number of false reports caused by misalignment as well as achievement of high sensitivity as a whole. In addition, the present invention provides a highly-sensitive comparison inspection method and an apparatus therefor, characterized by the following: a decrease in sensitivity of detection is kept within a required minimum by monitoring the accuracy of alignment so as to decrease the sensitivity of inspection only when misalignment occurs.

Moreover, in order to solve the problems of the conventional inspection technologies, the present invention provides a comparison inspection method and the apparatus therefor characterized by the following: in comparison inspection that compares an image to be inspected with a reference image to detect a defect judging from a difference between the images, adjusting the brightness at the edges of a high-contrast pattern in a target image before inspection so that a difference becomes small enables not only reduction in the number of false reports caused by an alignment error, but also achievement of high sensitivity, without increasing a threshold value TH. Furthermore, in the case of the inspection targeted for a semiconductor wafer, which produces the problem of irregularity in brightness of a pattern caused by a difference between film thicknesses, the present invention can reduce the number of false reports caused by the irregularity in brightness and realize inspection with high sensitivity without increasing the threshold value TH by adjusting the brightness of both images before the inspection.

SUMMARY OF THE INVENTION

According to one aspect of the present invention, there is provided a defect detection method, the defect detection method comprising the steps of: picking up a sample as a target to be inspected to obtain an image of the sample; comparing the image obtained from the picked-up sample with a stored reference image to calculate the quantity of displacement of the sample image relative to the reference image; using information about the calculated displacement to determine a difference between the sample image and the reference image by comparing the images; and detecting a defect of the sample judging from the determined difference; wherein when detecting a defect of the sample judging from the determined difference, the defect is detected by changing sensitivity according to contrast of the sample image or that of the reference image.

According to another aspect of the present invention, there is provided a defect detection method, the defect detection method comprising the steps of: picking up a sample as a target to be inspected to obtain an image of the sample; detecting the quantity of displacement of the sample image relative to a stored reference image to correct the detected displacement; correcting a difference in brightness between the sample image, the displacement of which has been corrected, and the reference image; and detecting a defect of the sample using the sample image and the reference image between which the difference in brightness has been corrected.

According to another aspect of the present invention, there is provided a defect detection method, the defect detection method comprising the steps of: picking up a sample as a target to be inspected to obtain an image of the sample; determining the quantity of displacement of the image obtained from the picked-up sample relative to a stored reference image; correcting the displacement of the sample image relative to the reference image on the basis of the quantity of displacement which has been determined; determining a contrast between the sample image, the displacement of which has been corrected, and the reference image; adjusting brightness of the sample image to that of the reference image using information about the determined contrast; extracting a defect candidate judging from a difference value between the sample image, the brightness of which has been adjusted, and the reference image; and detecting a defect from among the extracted defect candidates.

In addition, a defect detection apparatus according to the present invention performs inspection by comparing two images to detect a defect judging from a difference between the images, and comprises a means for detecting a defect by changing sensitivity of the inspection according to the contrast between the images. As an effective example, a defect detection apparatus according to the present invention comprises a means for detecting a defect with low sensitivity in a high-contrast part where even when the displacement is minute, a difference between the images becomes large, or with high sensitivity in a low-contrast part where the difference is kept small.

In addition, a defect detection apparatus according to the present invention comprises a means for performing correction according to a contrast between an image to be inspected and a reference image so that a difference between the images is minimized. As an effective example, a defect detection apparatus according to the present invention comprises a defect inspecting means characterized in that, in a high-contrast part where even when the displacement is minute, a difference between the images becomes large, correction is performed beforehand so as to minimize the difference; and in final defect detection processing, a defect is detected using a specific low threshold value, that is to say, with high sensitivity, for all contrasts.

Moreover, a defect detection apparatus according to the present invention comprises a means for monitoring the accuracy of displacement, and thereby for performing correction, only when misalignment occurs, so as to minimize a difference between the images in a high-contrast part where displacement causes improper detection.

Furthermore, a defect detection apparatus according to the present invention comprises a defect inspecting means characterized in that if an object to be inspected is a semiconductor wafer, and when a difference in film thicknesses in a wafer causes a difference in brightness of patterns corresponding to each other between the images, brightness is adjusted beforehand to detect a defect using only one low threshold value regardless of whether or not there is irregularity in brightness.

The means described above provide a defect detection method, and a defect detection apparatus, which can adjust sensitivity of all areas to be inspected using a single threshold value.

These and other objects, features and advantages of the invention will be apparent from the following more particular description of preferred embodiments of the invention, as illustrated in the accompanying drawings.

DESCRIPTION OF THE PREFERRED EMBODIMENTS

An embodiment of the present invention will be described in detail with reference to drawings below.

Figure 5:
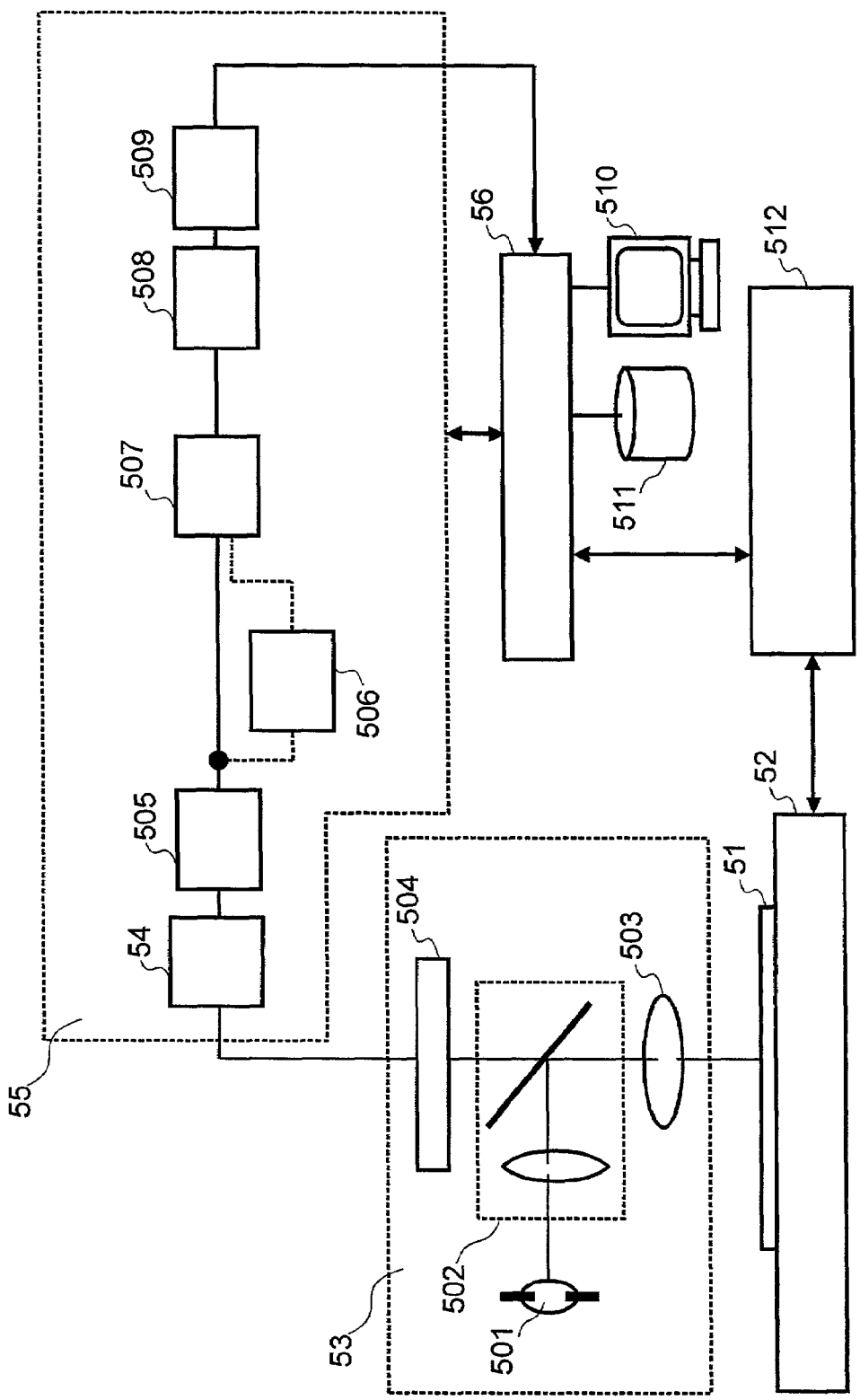
FIG. 5 is a block diagram illustrating a schematic configuration of an inspecting apparatus according to the present invention.

In this embodiment, a defect detection method of an optical visual inspecting apparatus targeted for a semiconductor wafer is taken as an example. FIG. 5 illustrates a configuration of the apparatus. Reference numeral 51 is a sample (an object to be inspected, such as a semiconductor wafer); reference numeral 52 is a stage on which the sample 51 is placed, and which can be moved at least in an XY plane; and reference numeral 53 is a detecting unit. The detecting unit 53 includes: a light source 501 for illuminating the sample 51; an illumination optical system 502 for condensing light emitted from the light source 501; an objective lens 503 through which the sample 51 is illuminated with illuminated light condensed in the illumination optical system 502, and through which an optical image obtained by reflection is formed; and an image sensor 504 for receiving the formed optical image, and for converting the received optical image into an image signal corresponding to its brightness. Reference numeral 55 denotes an image-processing unit, which processes an image detected by the detecting unit 53, and calculates a defect candidate in a wafer as a sample.

The image-processing unit 55 includes: an AD converter 54 for converting an input signal from the detecting unit 53 into a digital signal; a preprocessor 505 for performing image correction of the digital signal, such as shading correction or darkness level correction; a delay memory 506 for storing the digital signal, the image correction of which has been performed, as a reference image signal to be compared; a displacement detecting unit 507 for detecting the quantity of displacement of the digital signal detected by the detecting unit 53 (detected image signal) relative to the reference image signal of the delay memory 506, and thereby for correcting the displacement between both images; an image comparing unit 508 for comparing the image signal of the detected image, the displacement of which has been corrected, with the image signal of the reference image to determine a difference image between both images, and thereby for outputting, as a defect candidate, part of this difference image, a signal level of which is larger than a specific threshold value; and a defect judging unit 509 for calculating coordinates, an characteristic amount, etc., of the defect candidate to detect a real defect.

It is to be noted that the image processing unit 55 may also have a configuration in which the displacement detecting unit 507 only calculates the quantity of displacement of the detected image signal relative to the reference image signal, but does not correct the displacement between both the images, whereas the image comparing unit 508 uses information about the calculated displacement to determine a defect candidate judging from a difference image obtained from the detected image signal and the reference image signal. Thus, determining a defect candidate without correcting the displacement between both the images can avoid degradation of image data caused by displacing an image, which produces the effect of detecting a defect candidate with a higher degree of accuracy.

Reference numeral 56 denotes a total control unit, which includes: a user interface unit 510 having an inputting means for accepting a change of an inspection parameter from a user (a threshold value used for image comparison, etc.), and a displaying means for displaying the detected defect information; a storage device 511 for storing a characteristic amount and an image of the detected defect candidate; and a CPU for performing various kinds of control. Reference numeral 512 is a mechanical controller that drives the stage 52 according to a control instruction from the total control unit. Incidentally, the image processing unit 55, the detecting unit 53, and the like are also driven by an instruction from the total control unit 56.

Figure 6:
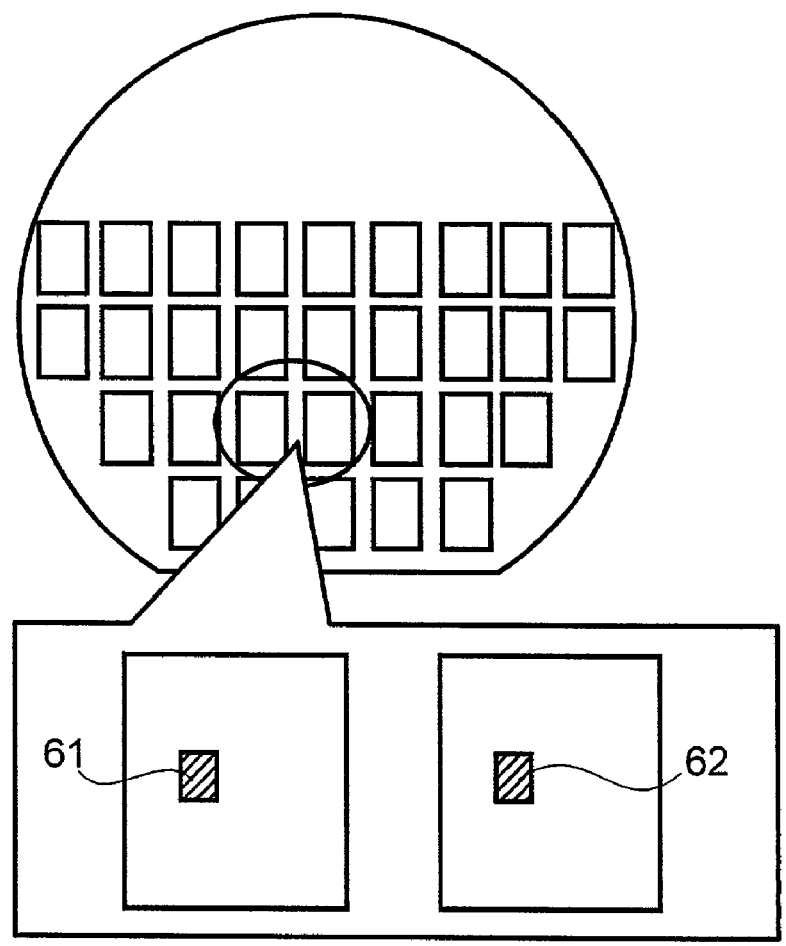
FIG. 6 is a plan view illustrating a semiconductor wafer as a target to be inspected.

As shown in FIG. 6, a large number of chips having the same pattern are regularly arranged in rows on the semiconductor wafer 51 as a target to be inspected. The inspecting apparatus shown in FIG. 5 compares two images located at the same position on two chips adjacent to each other (for example, compares an image surrounded by an area 61 with an image surrounded by an area 62 in FIG. 6) to detect a difference between the images as a defect. Its workings will be described. The total control unit 56 continuously moves the semiconductor wafer 51 as a sample using the stage 52. In synchronization with this move, an image of the chip is successively received by the detecting unit 53. The image sensor 504 of the detecting unit 53 outputs the received signal to the image-processing unit 55. In the image-processing unit 55, the AD converter 54 first converts the received analog signal into a digital signal, and then the preprocessor 505 performs shading correction, darkness level correction and the like. The displacement detecting unit 507 receives the following two signals as a set: an image signal (detected image signal) of a chip to be inspected which is output from the preprocessor 505; and an image signal delayed by a period of time during which the stage 1 moves by a length between chips, which is output from the delay memory 506, that is to say, an image signal of a chip just before the chip to be inspected (reference image signal).

Image signals of these two chips successively inputted in synchronization with the move of the stage do not reflect positions identical with each other if moving speed of the stage is irregular, the stage vibrates, or a wafer placed on the stage inclines. Accordingly, the displacement detecting unit 507 calculates the quantity of displacement between two images received successively. At this time, although the detected image signal and the reference image signal are inputted in succession, the quantity of displacement is successively calculated on a processing unit basis; in this case, the processing unit is a specific length. The following processing is also performed on each processing unit basis. The image comparing unit 508 uses the calculated quantity of displacement to align the images, compares the detected image with the reference image, and then outputs an area, a difference of which is larger than a specific threshold value, as a defect candidate. The defect-judging unit 509 edits each of the defect candidates; the editing includes the deleting of a small defect candidate as a noise, and the merging of adjacent defect candidates as one defect. After that, the defect-judging unit 509 calculates a characteristic amount such as a position, an area, and a size in a wafer, and then outputs them as final defects. The information is saved in the storage device 511. In addition, the information is displayed, for example, on a screen of the displaying means through the user interface unit 510 to present it to a user.

Figure 1:
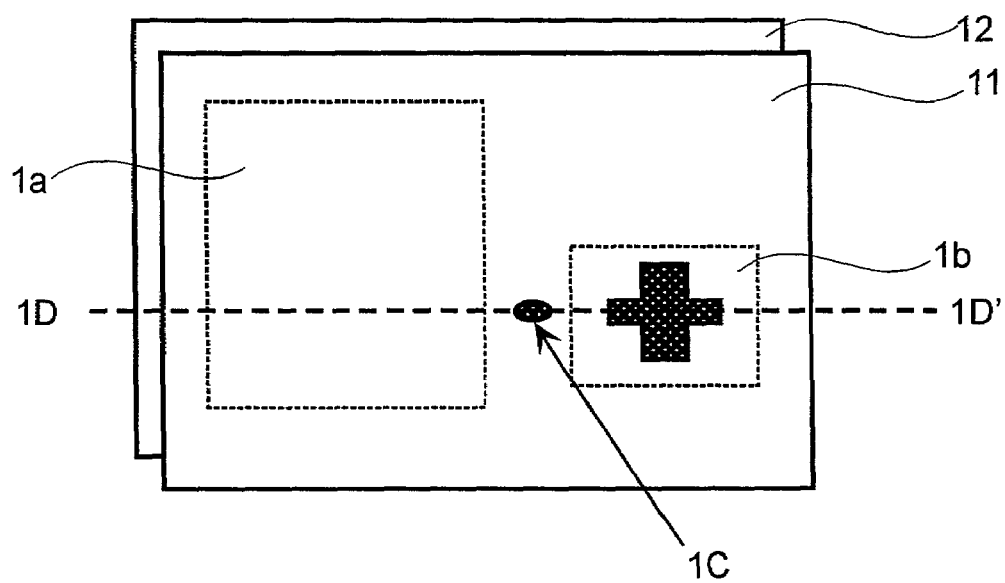
FIG. 1A is a diagram illustrating an image to be inspected.
FIG. 1B is a diagram illustrating a luminance waveform varying along line 1D–1D' of a difference image between images to be inspected 11 and 12.
Figure 1:
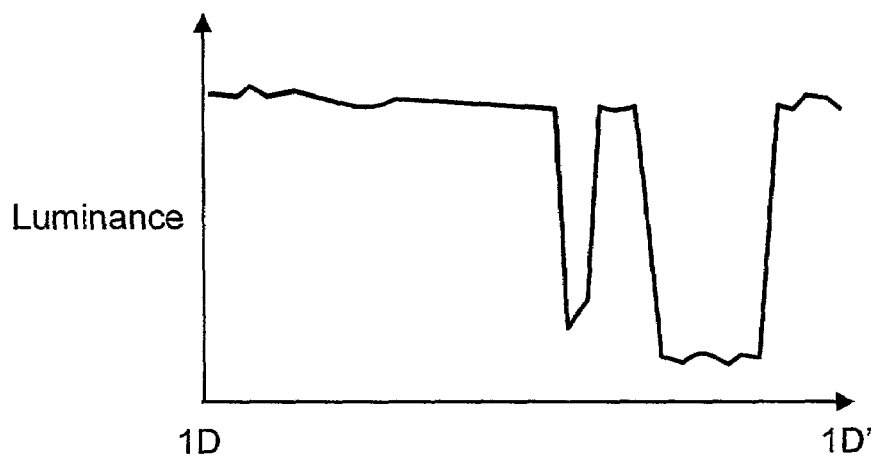
Figure 2:
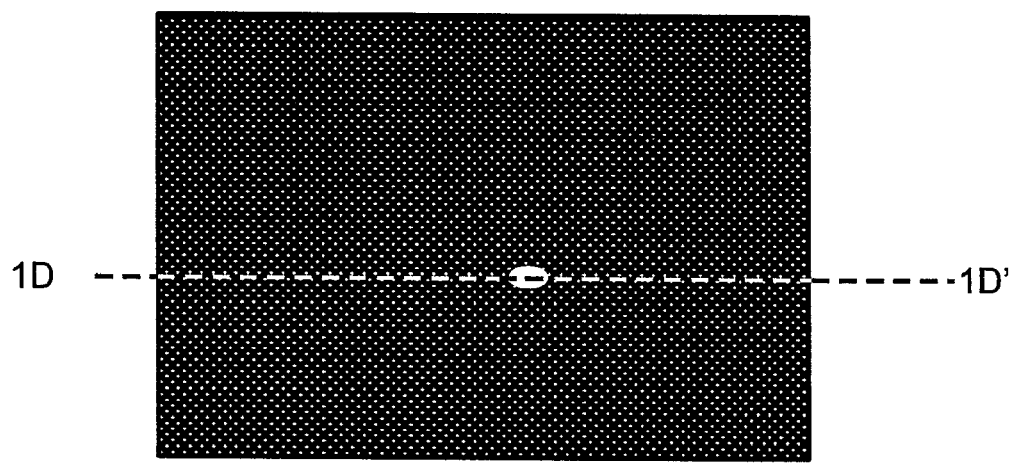
FIG. 2A is a diagram illustrating a difference image between the images to be inspected 11 and 12 shown in FIG. 1A.
FIG. 2B is a diagram illustrating a luminance waveform varying along line 1D–1D' of the difference image.
Figure 2:
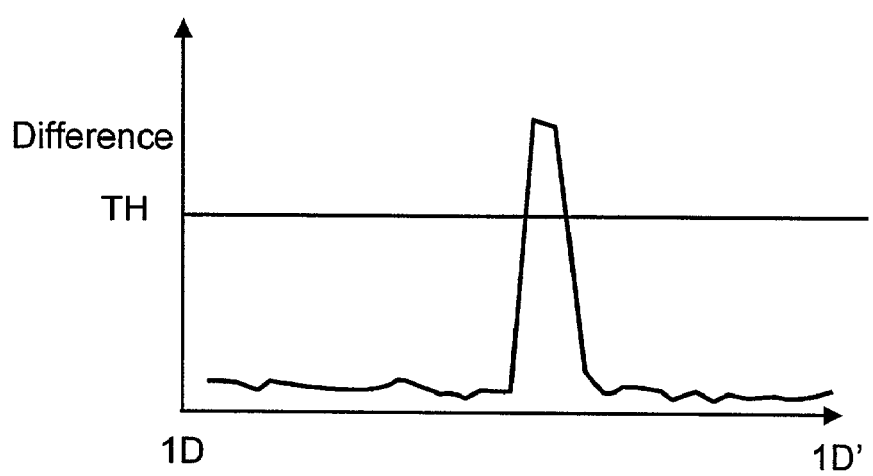

In this case, if the image-comparing unit 508 determines a defect candidate simply from a difference value, all of the defect candidates are not necessarily real defects. Its example will be described below. Reference numerals 11, 12 in FIG. 1A are a detected image and a reference image, respectively. Each of the images has a dark cross-shaped pattern on a uniformly bright background. In addition, only the detected image 11 includes a defect 1c. A graph in FIG. 1B illustrates a waveform of luminance values varying along line 1D–1D' on the detected image 11. As shown in this graph, the image includes a low-contrast area 1a, luminance of which is high and little changes, and a high-contrast area 1b, luminance of which is changeful because this area covers an edge of a pattern. FIG. 2A illustrates an image of difference values at corresponding positions obtained when the displacement detecting unit 507 calculates the correct quantity of displacement for these images to perform alignment. In other words, FIG. 2A illustrates an image in such a manner that a position where a difference is small is dark, and a position where a difference is large is bright. FIG. 2B illustrates a waveform of difference values varying along line 1D–1D'. If an area, a difference value of which is greater than or equal to a threshold value TH, is regarded as a defect, only an area of a defect 1c is detected.

Figure 3:
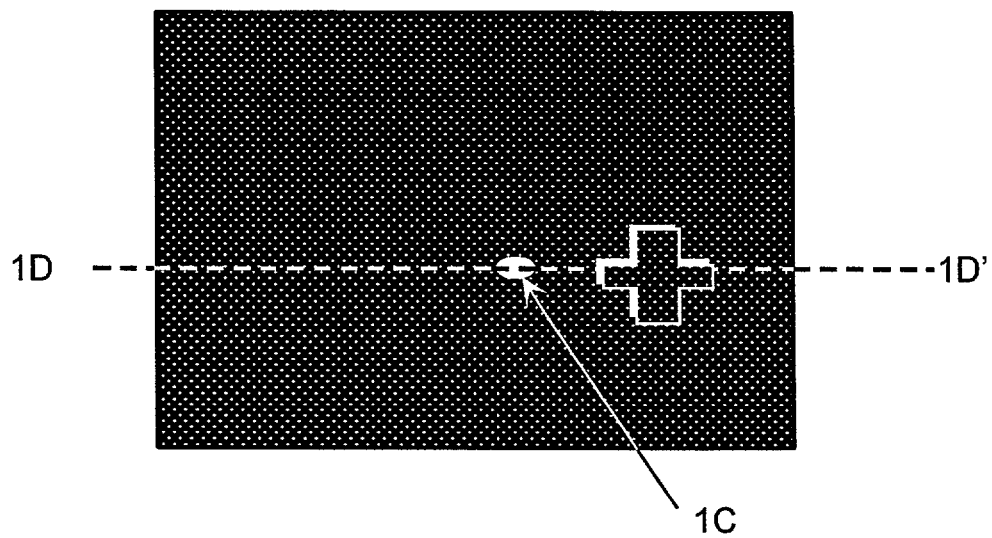
FIG. 3A is a diagram illustrating the difference image between the images to be inspected 11 and 12 shown in FIG. 1A.
FIG. 3B is a diagram illustrating the relation between a luminance waveform varying along line 1D–1D' of the difference image shown in FIG. 1B and threshold values TH, TH2.
FIG. 3C is a diagram illustrating the relation between a luminance waveform varying along line 1D–1D' of the difference image and the threshold values TH, TH2.
Figure 3:
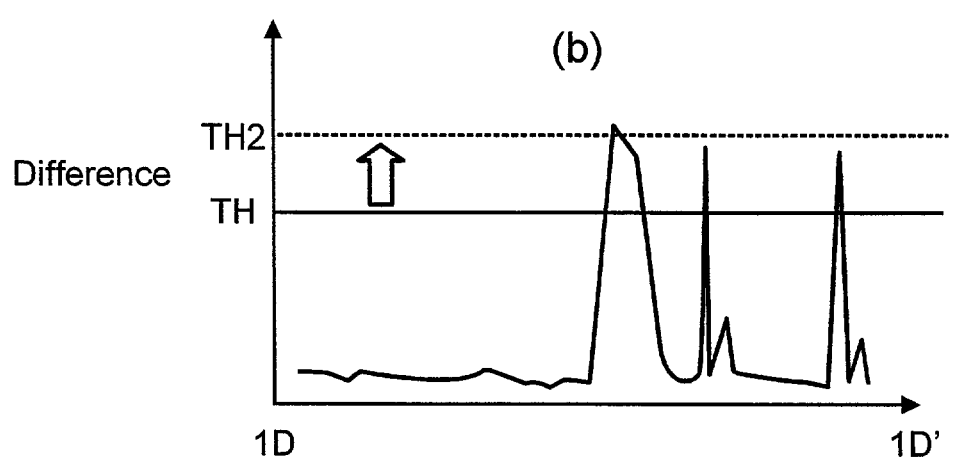
Figure 3:
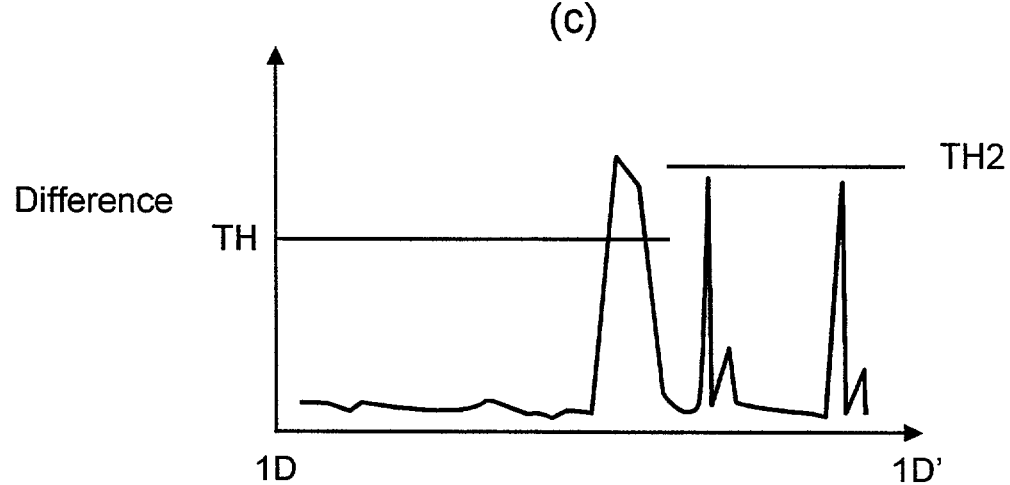

On the other hand, FIGS. 3A, 3B illustrate an image of a difference value and a waveform of the difference value, respectively. In this case, the difference value is obtained when the quantity of displacement has been incorrectly calculated resulting in improper alignment. As shown in FIG. 3A, as is the case with the area 1a shown in FIG. 1A, in the low-contrast area where a change in brightness is small, even if positions of the detected image 11 and the reference image 12 deviate from each other to some extent, a difference value does not become larger. On the other hand, in the high-contrast area like the area 1b where a change in brightness is large, even slight displacement causes a difference value to become larger. In this case, as shown in FIG. 3B, if an area, a difference value of which is greater than or equal to the threshold value TH, is regarded as a defect candidate, an area, a difference value of which has been increased by such displacement, will also be detected as a defect. Basically, such a defect should not be detected. Hereinafter the defect that is not a real defect is referred to as a false report. Conventionally, in order to prevent a false report caused by displacement from being detected, as shown in FIG. 3B, a threshold value is increased from TH to TH2 as one method. However, if this method is used, detection of a defect having a small difference value becomes impossible. To be more specific, using TH2 as a threshold value to prevent a false report from occurring means inspection with lower sensitivity. In addition, as another conventional method, as shown in FIG. 3C, the threshold value TH2 is used in the high-contrast area, and the threshold value TH is used in the low-contrast area. This means that there is a plurality of threshold values, resulting in complicated adjustment of sensitivity for a user.

Figure 4:
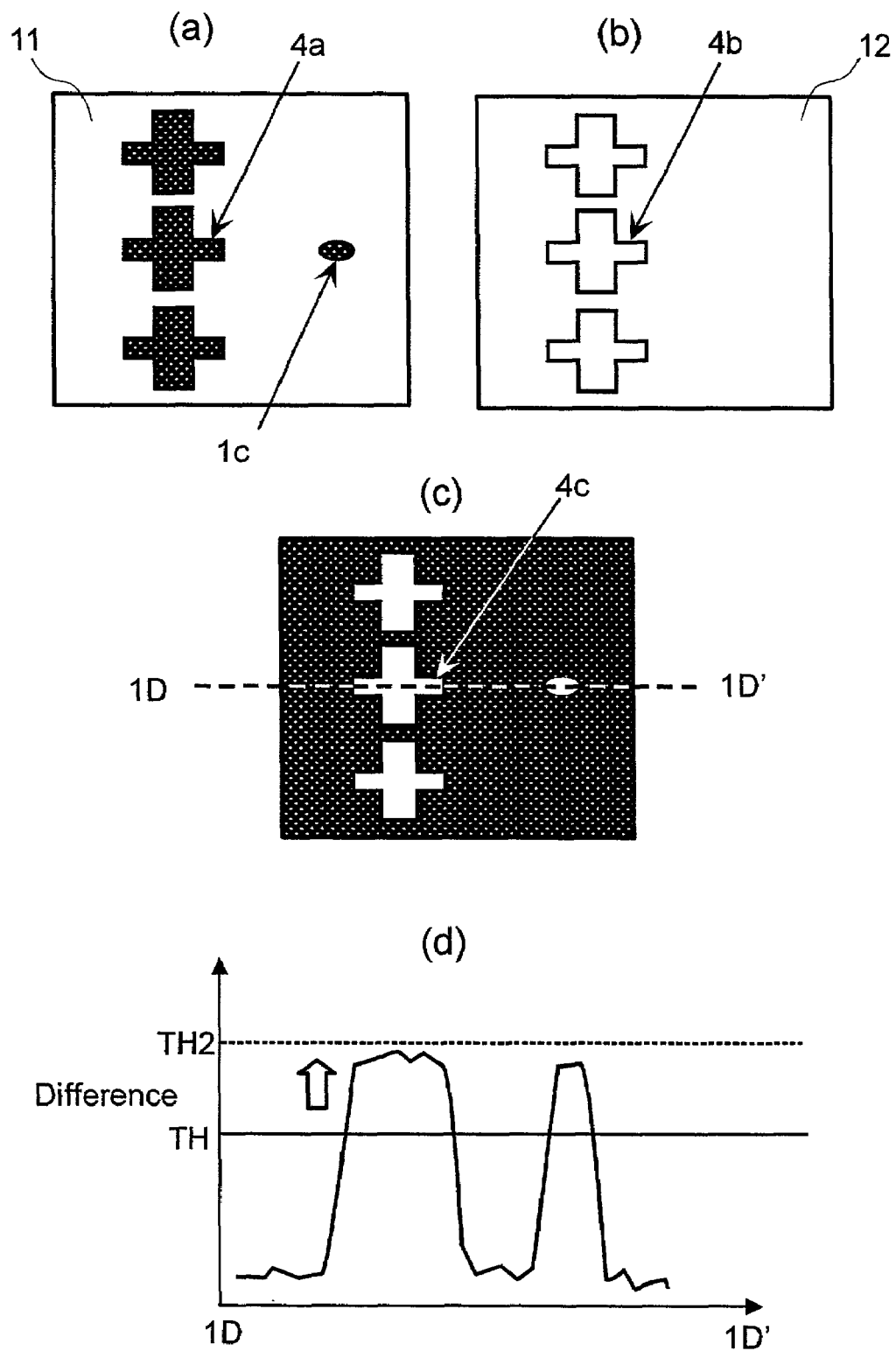
FIGS. 4A and 4B are diagrams illustrating images to be inspected observed when there is irregularity in brightness between compared chips.
FIG. 4C is a diagram illustrating a difference image between FIG. 4A and FIG. 4B.
FIG. 4D is a diagram illustrating a luminance waveform varying along line 1D–1D' in FIG. 4C, and threshold values TH, TH2.

Moreover, when a film thickness of the semiconductor wafer 51 is not uniform, a difference in brightness arises between the image to be inspected and the reference image. For example, three crosses in line, that is to say, 4a in FIG. 4A and 4b in FIG. 4B, are corresponding patterns in the image to be inspected 11 and the reference image 12. However, the brightness largely differs depending on a film thickness (hereinafter referred to as irregularity in brightness.) In addition, only the detected image 11 includes a defect 1c. FIGS. 4A through 4C illustrate an image of difference values at corresponding positions obtained when the displacement detecting unit 507 calculates the correct quantity of displacement for these images to perform alignment. However, even in the case of the same pattern, a difference value becomes larger at a position having irregularity in brightness. FIG. 4D illustrates a waveform varying along line 1D–1D' in FIG. 4C, which is a difference-value image along line 1D–1D'. If an area, a difference value of which is greater than or equal to a threshold value TH, is regarded as a defect, in addition to the defect 1c in FIG. 4A, a difference between the cross-shaped patterns 4a and 4b is also detected because the irregularity in brightness causes a difference value to increase. However, these are false reports. In order to prevent a false report caused by such irregularity in brightness from being detected, as is the case with the false report caused by displacement, several methods were conventionally used. One method is to increase a threshold value from TH to TH2 to perform inspection with low sensitivity as a whole. Another method is to adjust sensitivity by a plurality of threshold values before inspection; for example, the threshold value TH2 is used in an area having irregularity in brightness, and the threshold value TH is used in an area free from irregularity in brightness.

Figure 7:
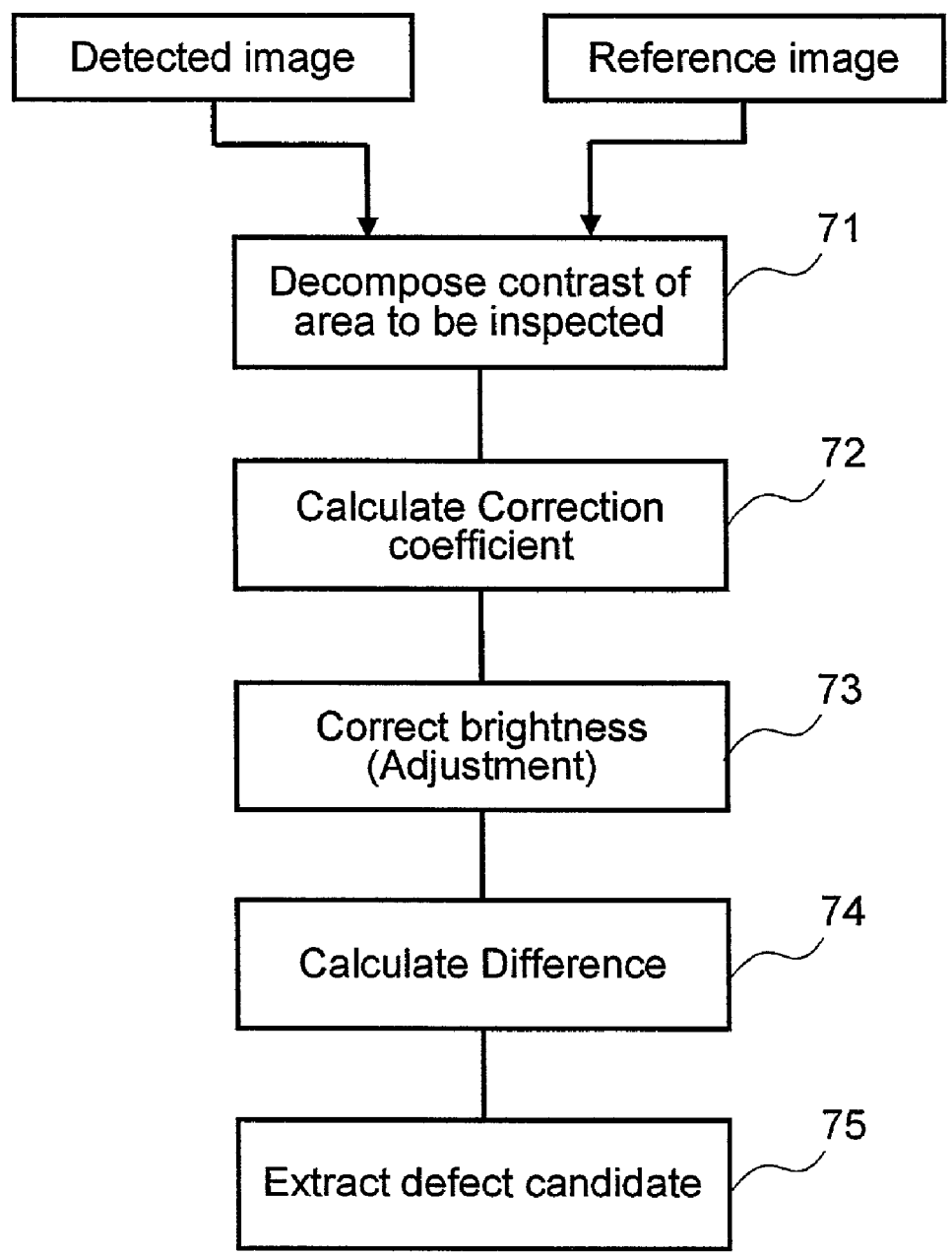
FIG. 7 is a flowchart illustrating a process flow of an image comparing unit according to the present invention.
Figure 8:
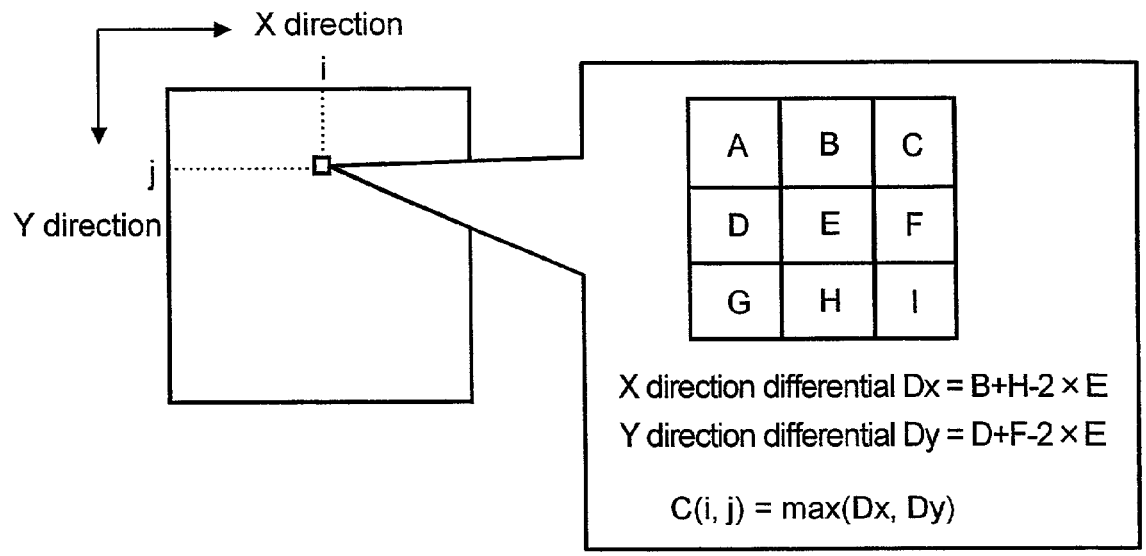
FIG. 8 is a conceptual illustration of a pixel, which illustrates an example of a contrast operation method in a target pixel.

As opposed to these, for the detected image, the displacement of which has been corrected by the displacement-detecting unit 507, and for the reference image, the image-comparing unit 508 makes an adjustment to brightness between the images beforehand before calculating a difference between the detected image and the reference image in the present invention. FIG. 7 is an example of a process flow of the image-comparing unit 508 according to the present invention. In the first place, using the detected image, the displacement of which has been corrected by the displacement detecting unit 507, and the reference image, a target area is divided into a part where brightness is uniform (low-contrast area) as shown in the area 1a in FIG. 1 and a part where brightness steeply changes (high-contrast area) like a pattern edge of the area 1b (step 71). As an example of a contrast resolving method, a contrast at a position (i, j) in a target area is determined as follows. As shown in FIG.

8, using luminance values A to I of a pixel in proximity to 9, a differential value Dx in an X direction and a differential value Dy in a Y direction are calculated by equations described below. A larger differential value between them is contrast C (i, j).

$$Dx = B + H - 2 \times E$$

$$Dy = D + F - 2 \times E$$

$$C(i, j) = \max(Dx, Dy)$$

Figure 9:
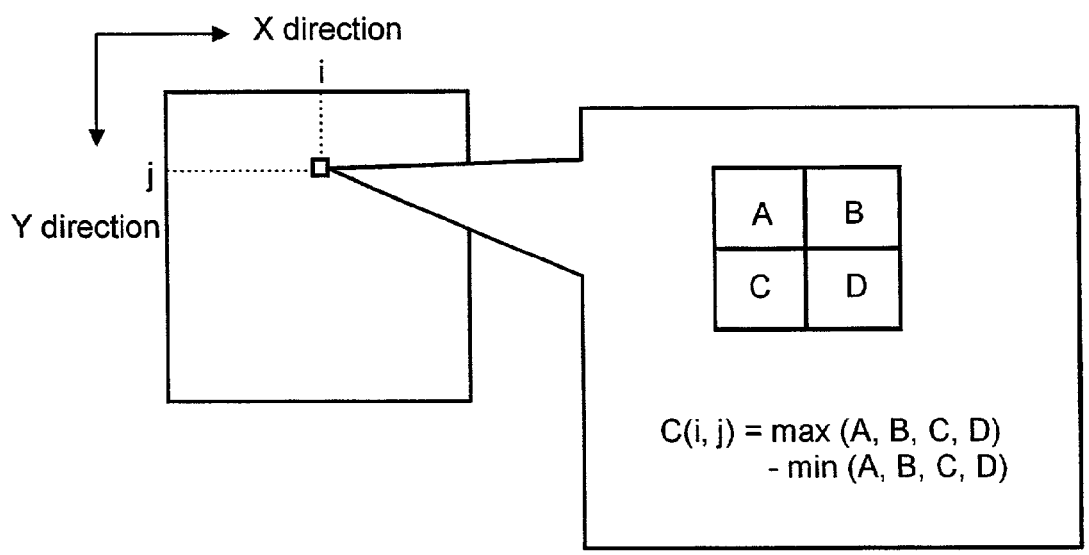
FIG. 9 is a conceptual illustration of a pixel, which illustrates an example of a contrast operation method in a target pixel.

In addition, as another example, using luminance values A through D of a pixel in proximity to 4 for each target pixel as shown in FIG. 9, a value obtained by subtracting a minimum value from a maximum value is regarded as contrast C (i, j) at the pixel.

$$C(i, j) = \max(A, B, C, D) - \min(A, B, C, D)$$

As a method for calculating a contrast at a target pixel, other than the two methods described above, various calculation methods can be used for determining a change in luminance in proximity. Accordingly, a contrast may be determined, for example, by calculating a contrast of each pixel using the detected image and the reference image, and then by averaging the contrasts among corresponding pixels of the detected image and the reference image. In such a manner, a contrast at each position in an area to be inspected is calculated, and then the area is resolved into several groups in response to the contrast value. Hereinafter the groups into which the area is resolved are referred to as contrast categories.

Figure 10:
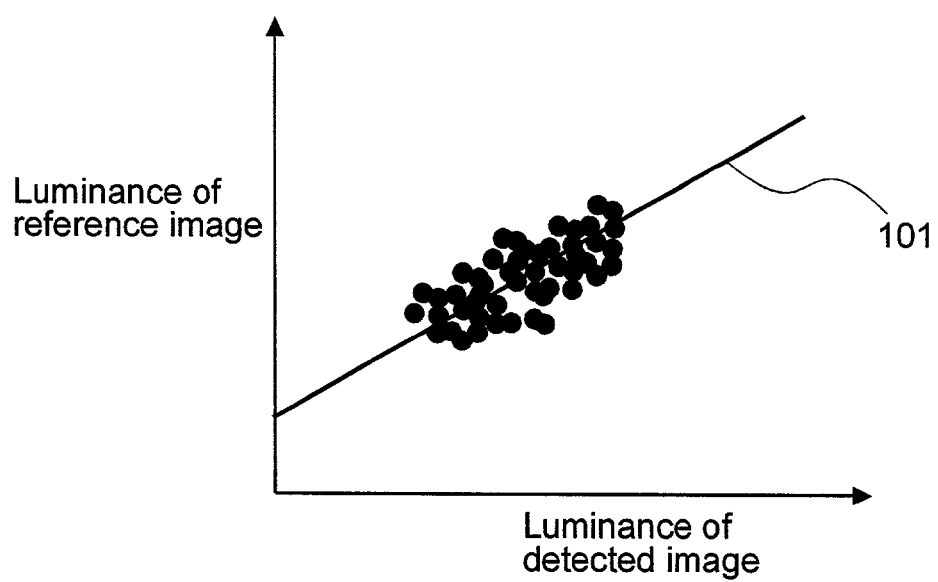
FIG. 10 is a scatter diagram illustrating the relation of the luminance values of an inspected image and those of a compared image.

In this manner, after resolving the area to be inspected into several contrast categories, a correction coefficient for adjusting the brightness is calculated for each category (step 72 in FIG. 7). If its example is described with reference to FIG. 10, in the first place, the contrast is resolved. Then, a scatter diagram illustrating pixels belonging to the same contrast category is made. In this case, the horizontal axis indicates luminance values of the detected image, and the vertical axis indicates luminance values of the corresponding reference image. After that, an approximate straight line is determined by the scatter diagram. Reference numeral 101 in FIG. 10 is an approximate straight line that has been determined by the scatter diagram of pixels belonging to a certain category. Although there are various methods for calculating an approximate straight line, as one example, there is least-square approximation (a method for determining a straight line such that the sum of distances from each point becomes the smallest). Here, an inclination a of the calculated approximate straight line, and Y intercept b, become correction coefficients of the contrast category. Using the correction coefficients calculated in this way, correction by adjustment of the brightness is performed (73 in FIG. 7). In reality, if a luminance value of each pixel of a detected image is F (i, j), a luminance value D (i, j) after correction is corrected using an equation as below.

$$D(i, j) = F(i, j) \times a + b$$

After that, a difference between the luminance value D (i, j) of the detected image after correction and the luminance value G (i, j) of the reference image is determined (step 74 in FIG. 7). Then, a part, a difference value of which is larger than the predetermined threshold value TH, is regarded as a defect candidate (step 75 in FIG. 7).

In this case, the luminance value D (i, j) after correction becomes closer to the luminance value G (i, j) of the reference image as its pixel is closer to the approximate straight line in the scatter diagram. In other words, high-level correction will be performed. For this reason, a method for making a scatter diagram may also be changed according to the contrast. For example, as described above, even if there is displacement to some extent in a high-contrast area, its difference value becomes large. Accordingly, high-level correction of the high-contrast area is performed to adjust the brightness so that a difference value becomes smaller.

Figure 11:
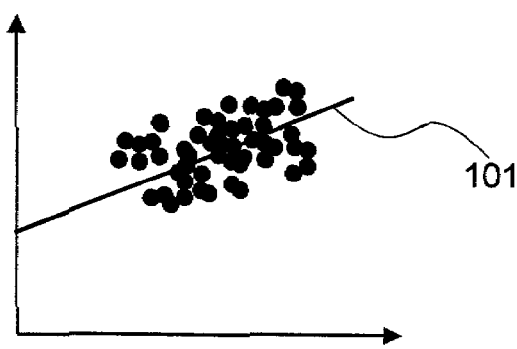
FIGS. 11A to 11C each are a scatter diagram illustrating the luminance values of an inspected image and those of a compared image.
Figure 11:
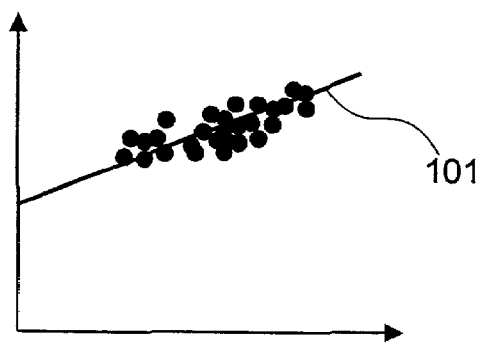
Figure 11:
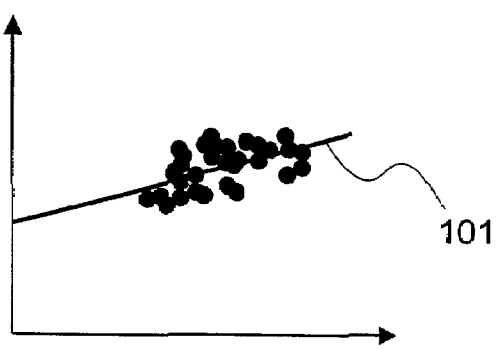

For example, as shown in FIG. 11A, straight line approximation is performed using a wide distribution area of the scatter diagram, in a low-contrast area. On the other hand, as shown in FIG. 11B or 11C, division into smaller categories is performed in a high-contrast area, and thereby straight line approximation is performed using a narrower area of the scatter diagram. To be more specific, because low-level correction of brightness is performed in a low-contrast area, a difference between both of the detected image and the reference image is detected with high sensitivity. On the other hand, because high-level correction is performed in a high-contrast area, a difference between both images becomes small, resulting in low sensitivity of defect detection. In other words, a defect is detected with high sensitivity in the low-contrast area; and a defect is detected with low sensitivity in the high-contrast area.

Further, irregularity in brightness easily occurs in the low-contrast area. Therefore, in order to reduce influence of this irregularity in color, the low-contrast area is divided into smaller categories to make a major adjustment to the brightness. In other words, in the low-contrast area, a defect may be detected with sensitivity lower than that in the high-contrast area.

In short, the present invention is characterized in that brightness is adjusted in accordance with a contrast between both the detected image and the reference image before determining a difference between both the images.

Moreover, as a matter of course, the same brightness correction may also be performed for all contrasts (all areas.) Furthermore, while the accuracy of displacement detection is always monitored, only when the quantity of displacement is not correctly calculated, the brightness can also be adjusted in the high-contrast area at a level higher than usual.

Categories may also be subdivided in accordance with contrast values, or may also be subdivided using another characteristic amount. For example, after evaluating a difference between a defect and irregularity in brightness judging from a certain characteristic, in an area having a characteristic as irregularity in brightness, a major adjustment to brightness is made by determining an approximate straight line by pixels in proximity to the area in the scatter diagram. In an area having a characteristic representing a defect, a minor adjustment to brightness is made by determining an approximate straight line by pixels away from the area in the scatter diagram.

Figure 12:
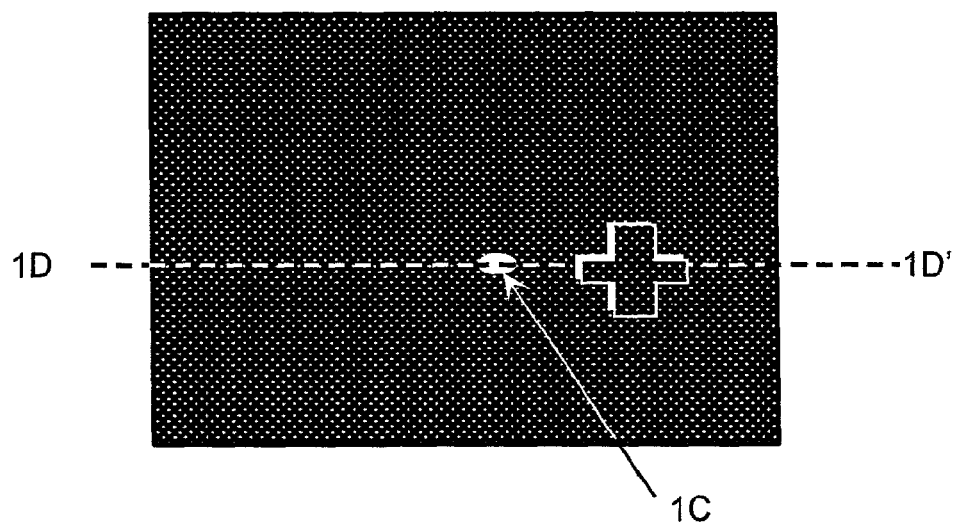
FIG. 12A is a diagram illustrating a difference image corresponding to that shown in FIG. 3A.
FIG. 12B is a diagram illustrating a luminance waveform varying along line 1D–1D', corresponding to that shown in FIG. 3B.
FIG. 12C is a diagram illustrating a waveform varying along line 1D–1D', which is observed after adjustment of brightness according to the present invention.
Figure 12:
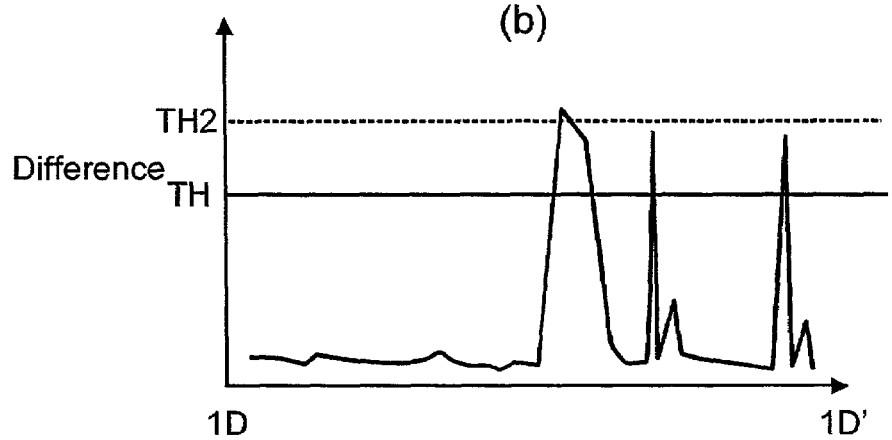
Figure 12:
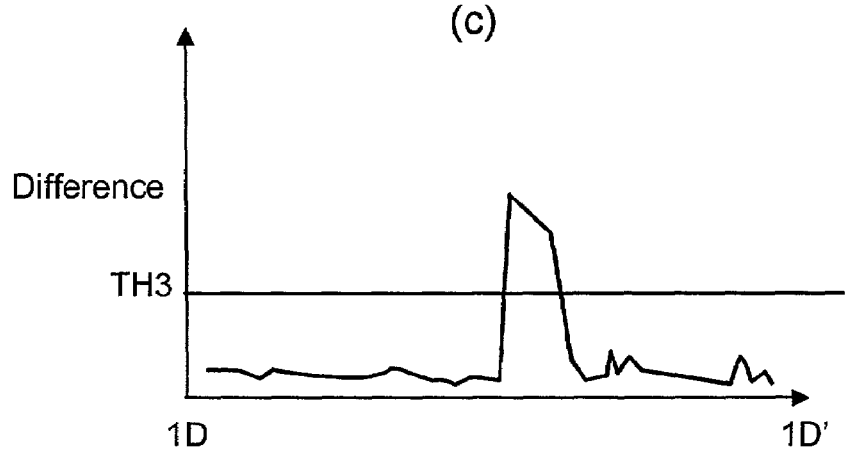

As described above, according to the present invention, two images are compared to each other to determine a difference value, which is used for detecting a defect. In such inspection, in a high-contrast area where a false report is easily caused by displacement, a major adjustment to brightness is made as the need arises; and in an area where there is irregularity in brightness, a major adjustment to brightness is also made. On the other hand, in an area having a characteristic representing a defect, a minor adjustment to brightness is made. FIG. 12C is a waveform of difference values after the adjustment of brightness according to the present invention, observed when the quantity of displacement has not been correctly detected, as shown in FIG. 12A (equivalent to FIG. 3A). As shown in FIG. 12B (equivalent to FIG. 3B), as compared with the case where the adjustment of brightness is not performed, the frequency of false reports be reduced, enabling defect detection using one threshold value TH3.

Figure 13:
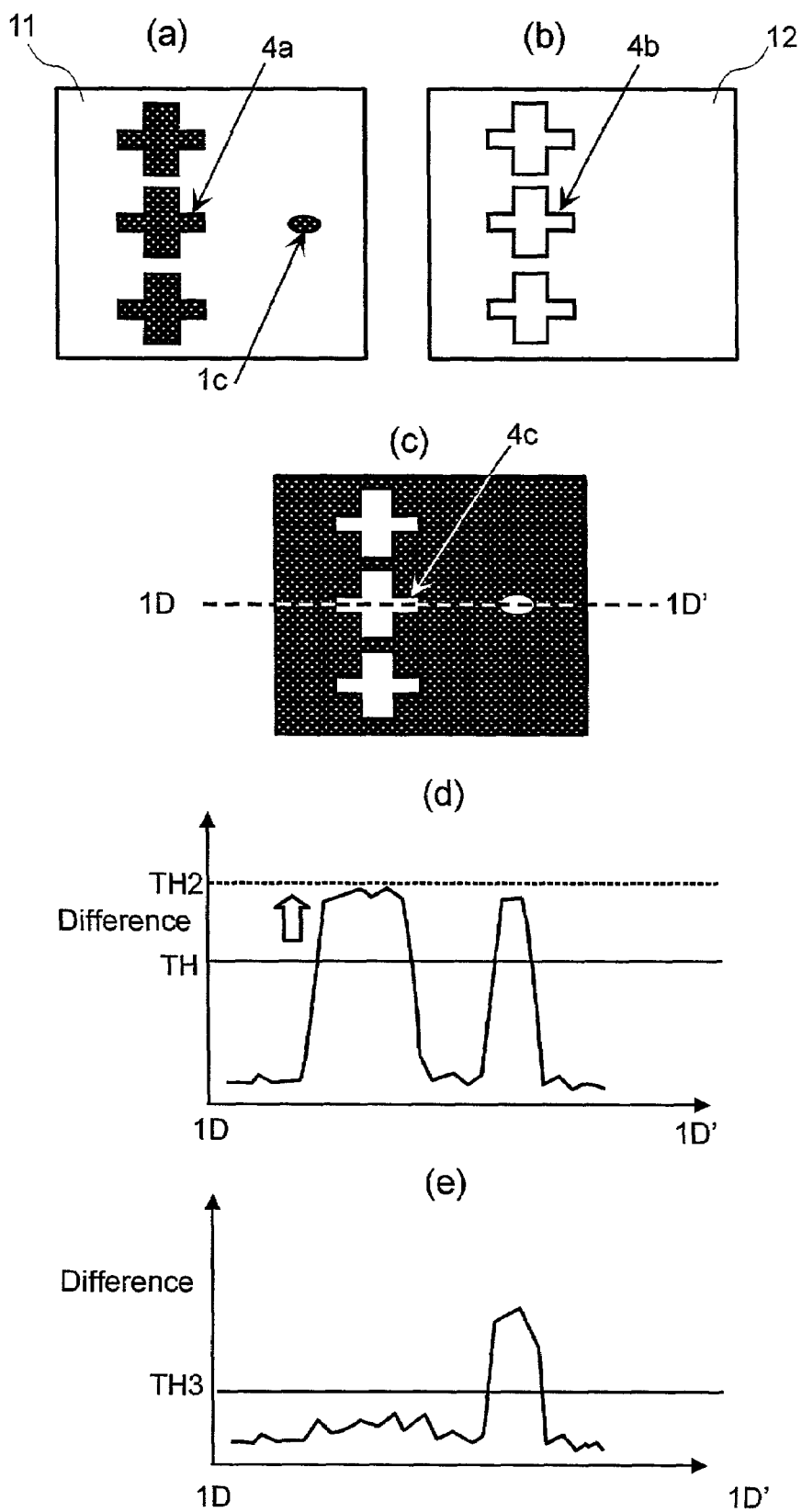
FIGS. 13A and 13B are diagrams illustrating images to be inspected observed when there is irregularity in brightness between compared chips, which correspond to FIGS. 4A and 4B.
FIG. 13C is a diagram illustrating a difference image between FIGS. 13A and 13B, which correspond to FIG. 4C.
FIG. 13D is a diagram illustrating a waveform varying along line 1D–1D', which corresponds to that shown in FIG. 4D.
FIG. 13E is a diagram illustrating a waveform varying alone line 1D–1D', which is observed after adjustment of brightness according to the present invention.

For a difference image in FIG. 13C (equivalent to FIG. 4C), which is observed when there is irregularity in brightness in FIGS. 13A and 13B (equivalent to FIGS. 4A and 4B), FIG. 13D illustrates a waveform of difference values after the adjustment of brightness according to the present invention.

In both cases of FIGS. 12C and 13D, it is possible to make a difference value small by making an adjustment to brightness of an area which should not be detected as a defect basically. As opposed to this, because a minor adjustment to brightness is made in a defect part, a difference value does not become very small. Accordingly, a false report is conventionally prevented by setting a threshold value at TH2 for all areas, or by setting two threshold values at TH and TH2, as shown in FIGS. 12C and 13D. However, according to the present invention, a false report caused by displacement and irregularity in brightness can be prevented without decreasing sensitivity. In addition to it, high-sensitivity inspection and easy adjustment to sensitivity become possible using only the low threshold value TH3, as shown in FIGS. 12D and 13E.

As described above, one embodiment according to the present invention has been described using, as an example, an image to be compared and inspected in an optical visual inspecting apparatus targeted for a semiconductor wafer. The embodiment can also be applied to an image to be compared in electron-beam pattern inspection and inspection by a DUV method. Moreover, a target to be inspected is not limited to a semiconductor wafer. As long as a defect is detected by comparing images, for example, a TFT substrate, a photo mask, and a circuit board can also be applied.

Next, another embodiment of a process flow in the image processing unit 55 according to the present invention will be described with reference to FIGS. 14 and 15. The image-processing unit 55 extracts a continuously inputted digital image of an adjacent chip of the wafer 51 on a constant length basis, and then performs defect detection processing for each extracted area. In the first place, the quantity of displacement between images is calculated (step 141). Next, using the quantity of displacement that has been calculated, alignment of the inspection image and the reference image is performed (step 142). In addition, using the quantity of displacement that has been calculated to monitor as to whether or not the alignment of step 142 is correctly performed (step 143). Then, a difference image reflecting a difference between images for which alignment has been performed is calculated (step 144). After that, if the alignment is judged to be incorrect as a result of the monitoring, the difference image is corrected so as not to cause improper detection (hereinafter referred to as a false report) in a displaced part (step 145). Then, coordinates of a position corresponding to the inspection threshold value TH or more is determined for the difference image after the correction, and thereby this position is extracted as a defect candidate (146). The coordinates and characteristic amounts of the defect candidate are transmitted to the storage device 511 where they are saved in a hard disk.

Next, an example of processing in the image-processing unit will be described. Reference numeral 151 is FIG. 15 denotes a defect detection target image. A background of the defect detection target image 151 has high luminance. Reference numeral 152 is a pattern that is slightly darker than the background. Reference numeral 153 is a pattern that is considerably darker than the background. Reference numeral 154 is a defect. Reference numeral 155 is a graph illustrating luminance values along line A–B on this image. To begin with, in the flowchart shown in FIG. 14, the quantity of displacement between such two images is calculated in step 141, and then alignment is performed in step 142. Here, if correct alignment has been performed, a difference image is calculated by step 144.

As described above, one embodiment according to the present invention was described using, as an example, an alignment method in the optical visual inspecting apparatus targeted for a semiconductor wafer. The present invention can also be applied to alignment of an image to be compared in electron-beam pattern inspection and inspection by a DUV method. Moreover, a target to be inspected is not limited to a semiconductor wafer. As long as a defect is detected by comparing images, for example, a TFT substrate, a photo mask and a circuit board can also be applied.

As described above, according to the present invention, making an adjustment to brightness in accordance with contrast, for example, making a major adjustment as the need arises, enables reduction in occurrence of a false report. In addition, making an adjustment to brightness for irregularity in brightness also enables reduction in occurrence of a false report. As a result, setting of a low inspection threshold value becomes possible, which realizes inspection with high sensitivity. Furthermore, setting only one threshold value enables both reduction in occurrence of a false report and detection of a defect, which facilitates adjustment of sensitivity.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A defect detection method comprising the steps of:
   picking up a sample as a target to be inspected to obtain an image of the sample;
   comparing the image obtained from the picked-up sample with a stored reference image to calculate the quantity of displacement of the sample image relative to the reference image;
   using information about the calculated displacement to determine a difference between the sample image and the reference image by comparing the images; and
   detecting a defect of the sample judging from the determined difference;
   wherein in the step of detecting, the defect is detected by changing sensitivity according to contrast of the sample image or that of the reference image and comprises the steps of:
   according to a contrast between the sample image and the reference image, correcting brightness so that brightness of at least the sample image or the reference image is adjusted to that of the other;
   determining a difference image between the images, the brightness of which has been corrected; and
   detecting a defect judging from the difference image.

2. A defect detection method according to claim 1, wherein a pattern is formed in the sample, and inspection with low sensitivity is performed at the edges of the pattern.

3. A defect detection method comprising the steps of:
picking up a sample as a target to be inspected to obtain an image of the sample;
comparing the image obtained from the picked-up sample with a stored reference image to calculate the quantity of displacement of the sample image relative to the reference image;
using information about the calculated displacement to determine a difference between the sample image and the reference image by comparing the images; and
detecting a defect of the sample judging from the determined difference;
wherein a defect is detected with low sensitivity in a high-contrast part of the sample image or that of the reference image, and a defect is detected with high sensitivity in a low-contrast part.

4. A defect detection method comprising the steps of:
picking up a sample as a target to be inspected to obtain an image of the sample;
detecting the quantity of displacement of the sample image relative to a stored reference image to correct the detected displacement;
correcting a difference in brightness between the sample image, the displacement of which has been corrected, and the reference image;
determining a difference image between the sample image, the brightness of which has been corrected, and the reference image;
comparing the difference image with a predetermined threshold value to extract a defect candidate; and
detecting a defect from among the extracted defect candidate.

5. A defect detection method to claim 4, wherein the difference in brightness between the sample image, the displacement of which has been corrected, and the reference image is corrected in response to a distribution of contrasts of the sample image of the reference image.

6. A defect detection method to claim 5, wherein the difference in brightness between the sample image, the displacement of which has been corrected, and the reference image is corrected by adjusting brightness of the sample image to that of the reference image according to a distribution of contrasts of the sample image and the reference image.

7. A defect detection method comprising the steps of:
picking up a sample as a target to be inspected to obtain an image of the sample;
determining the quantity of displacement of the image obtained from the picked-up sample relative to a stored reference image;
correcting the displacement of the sample image relative to the reference image on the basis of the quantity of displacement which has been determined;
determining a contrast between the sample image, the displacement of which has been corrected, and the reference image;
adjusting brightness of the sample image to that of the reference image using information about the determined contrast;
extracting a defect candidate judging from a difference value between the sample image, the brightness of which has been adjusted, and the reference image; and
detecting a defect from among the extracted defect candidate.

8. A defect detection method according to claim 7, wherein:
said extraction of a defect candidate judging from a difference value between the sample image, the brightness of which has been adjusted, and the reference image is performed by comparing the difference value with a threshold value; and
as a threshold value, the same value is used for the whole inspection area of the sample image.

9. A defect detection method according to claim 7, wherein brightness of the sample image is adjusted to that of the reference image to different degrees for the high-contrast part and the low-contrast part which have been determined.

10. A defect detection method comprising the steps of:
picking up a sample as a target to be inspected to obtain an image of the sample;
adjusting brightness of a part of the obtained sample image to that of its corresponding part of a stored reference image;
determining a difference between the part of the sample image, the brightness of which has been adjusted, and the corresponding part of the reference image;
comparing the determined difference with a threshold value to extract a defect candidate; and
detecting a defect from among the extracted defect candidate.

11. A defect detection method according to claim 10, wherein brightness of the sample image is adjusted to that of the reference image using information about a distribution of contrasts of the sample image and the reference image.

12. A defect detection method according to claim 10, wherein a part where a contrast between the sample image and the reference image is high, brightness of the sample image is adjusted to that of the reference image on a smaller area basis as compared with a low-contrast part.

13. A defect detection method according to claim 10, wherein as the threshold value, the same value is used for the whole inspection area of the sample image.

14. A defect detection method according to claim 10, further comprising the steps of;
correcting the image obtained from the picked-up sample and the stored reference image; and
adjusting brightness of a part of the corrected sample image to that of its corresponding part of the reference image.

15. A defect detection method according to claim 14, wherein, in said step for correcting the images, image correction including shading correction and darkness level correction is performed for the sample image and the reference image.

16. A defect detection method according to claim 10, further comprising the steps of:
calculating the quantity of displacement of the image obtained from the picked-up sample relative to the stored reference image; and
adjusting brightness of part of the sample image, the quantity of displacement of which has been calculated, to that of its corresponding part of the reference image.

17. A defect detection method according to claim 16, further comprising the steps of:
correcting the displacement of the sample image relative to the reference image on the basis of the quantity of displacement which has been calculated; and
adjusting brightness of part of the sample image, the quantity of displacement of which has been corrected, to that of its corresponding part of the reference image.

18. A defect detection apparatus comprising:
a stage on which a sample as a target to be inspected is placed;

illuminating means for illuminating the sample placed on the stage;

image formation optical system means for imaging an image of reflected light from the sample, which is illuminated by the illuminating means, on an image sensor;

circuit means for converting an output signal from the image sensor, which has detected the image of the reflected light, into a digital image;

memory means for storing the digital image converted by the circuit means;

displacement correcting means for correcting displacement of the image to be inspected, which is a digital image converted by the circuit means, relative to the reference image which is a digital stored in the memory means;

brightness correcting means for correcting a difference in brightness between the image to be inspected, the displacement of which has been corrected by the displacement correcting means, and the reference image;

image processing means for determining a difference image between the image to be inspected, the brightness of which has been corrected by the brightness correcting means, and the reference image to detect a defect of the sample judging from the difference image; and output monitoring means for displaying information about the defect detected by the image processing means;

wherein the brightness correcting means corrects a difference in brightness between the image to be inspected and the reference image according to a contrast between the image to be inspected and the reference image.

19. A defect detection method according to claim 18, wherein the image processing means extracts, as a defect candidate, a difference image having a signal larger than a predetermined threshold value from among difference images between the image to be inspected and the reference image, between which the difference in brightness has been corrected by the brightness correcting means.

20. A defect detection method according to claim 18, wherein the image processing means uses the same value for the whole inspection area of the sample image.

21. A defect detection method according to claim 18, wherein the image processing means detects a defect judging from coordinates and characteristic amounts of the extracted defect candidate.

22. A defect detection method comprising the steps of:

picking up a sample as a target to be inspected to obtain an image of the sample;

comparing the image obtained from the picked-up sample with a stored reference image to calculate the quantity of displacement of the sample image relative to the reference image;

using information about the calculated displacement to determine a difference between the sample image and the reference image by comparing the images; and detecting a defect of the sample judging from the determined difference;

wherein a defect is detected with high sensitivity in a high-contrast part of the sample image or that of the reference image, and a defect is detected with low sensitivity in a low-contrast part.

23. A defect detection method according to claim 22, wherein a pattern is formed in the sample, and inspection with the low sensitivity is performed at the edges of the pattern.

\* \* \* \* \*